Feb. 8, 1966          K. T. L. BERGMAN          3,234,347

PROTECTIVE SWITCHING ARRANGEMENT WITH DEMOUNTABLE FUSE CARRIER

Filed Sept. 11, 1963                               5 Sheets-Sheet 1

KURT T. L. BERGMAN
INVENTOR.

BY

AGENT

INVENTOR.
KURT TAGE LENNART BERGMAN
BY

Karl F. Ross

AGENT

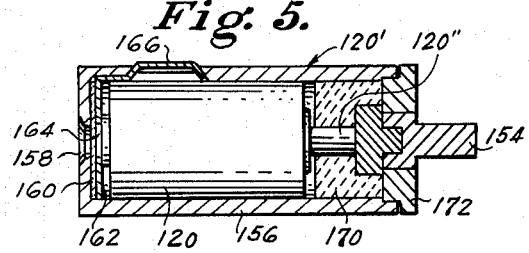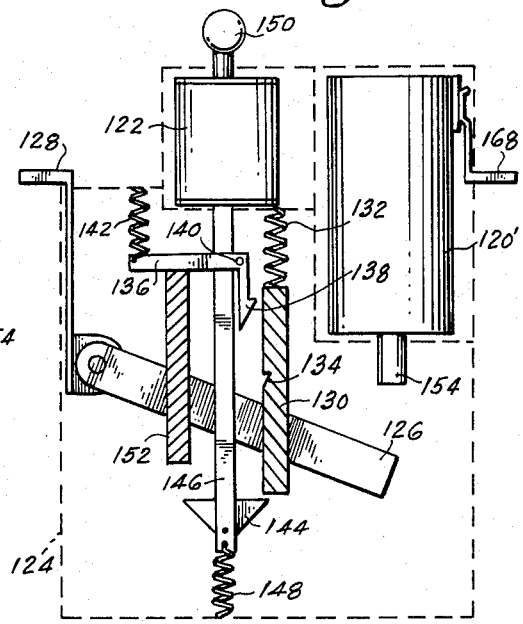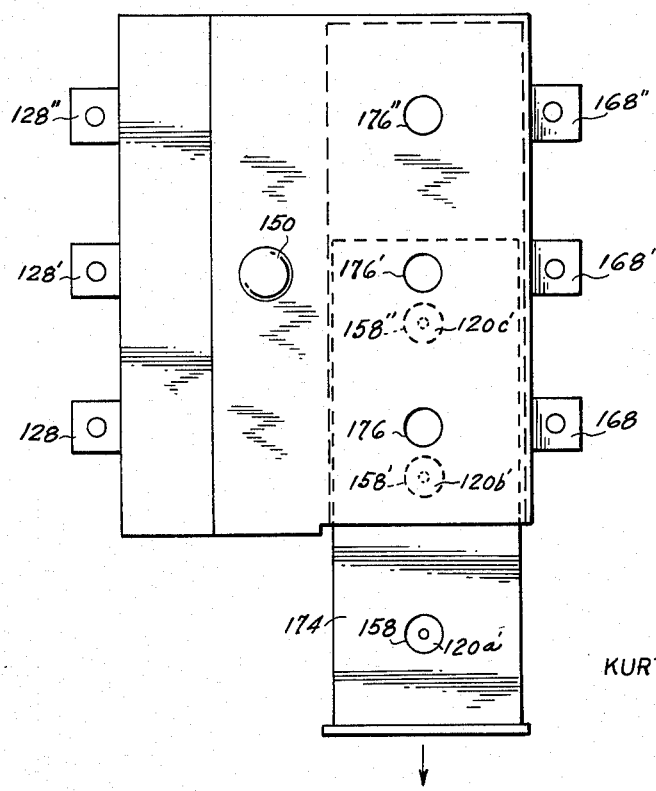

INVENTOR.
KURT TAGE LENNART BERGMAN
BY
Karl F. Ross
AGENT

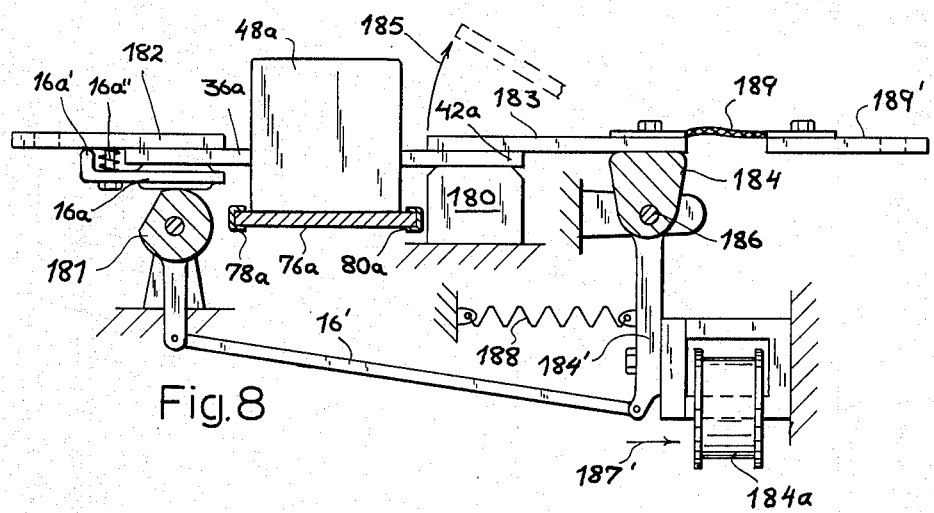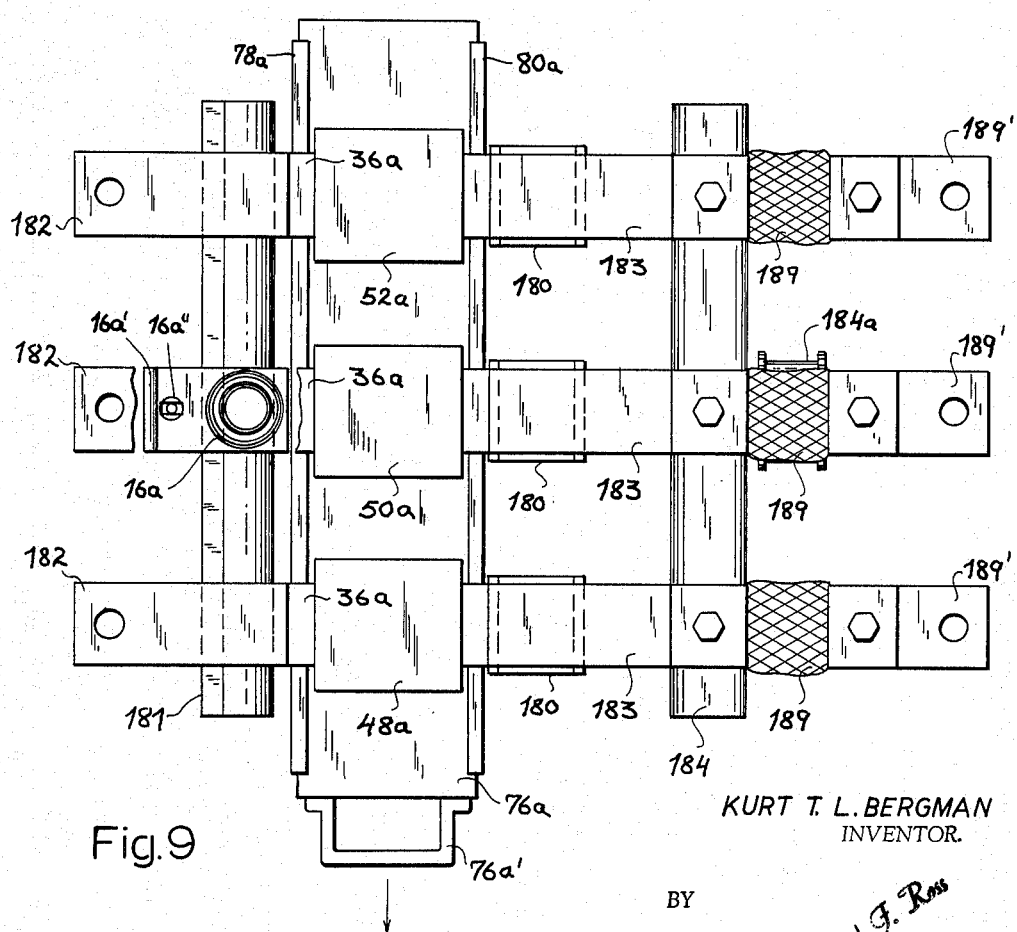

United States Patent Office 3,234,347
Patented Feb. 8, 1966

3,234,347
PROTECTIVE SWITCHING ARRANGEMENT WITH DEMOUNTABLE FUSE CARRIER
Kurt Tage Lennart Bergman, Sundsvall, Sweden, assignor to David Olof Hägglund, Ornskoldsvik, Sweden
Filed Sept. 11, 1963, Ser. No. 308,925
9 Claims. (Cl. 200—114)

My present invention relates to remotely operable (i.e., relay-type) switches having at least one movable and at least one stationary contact member connected in series with a circuit-protective overload device and, more particularly, to remotely controlled switch mechanisms provided with thermally responsive fuse elements in series therewith.

It has been proposed hitherto to provide electromagnetically operable relays and the like with fuse elements respectively connected in series with each pair of cooperating contact members. In general, however, such switch devices are provided with a multiplicity of sets of contact mebers, each of which controls a respective circuit, associated with a common operating mechanism for the activation of deactivation of the plurality of circuits to be controlled simultaneously. Of particular importance, in this connection, are multiphase electric systems (e.g., three-phase networks) for which electromagnetically operable switch devices and relays are provided with at least three sets of contact members operable concurrently to energize each of the three-phase current-carrying lines. When it is desirable to connect a thermally operated overload device in series with the respective set of switch contacts, the overload device (e.g., a fuse) is usually mounted upon a panel associated with the electromagnetically operable switch means.

Since the compactness of the entire installation is usually a factor, it has been the practice to mount the fuse panel at a location spaced from the relay or switch, in which case service difficulties ensue because it is not always clear which fuse is associated with a particular set of contact members unless clearly observable indicia are provided. Furthermore, this arrangement often requires excessively long leads between the fuse and switch panels, these leads themselves being frequently a source of disturbance. Nevertheless, rewiring of the switch and fuse box often results in an incorrect and undesirable reassignment of a particular fuse with a particular set of contact members. When the fuse block was mounted directly upon the switch means of earlier devices, however, exceptionally complicated switch-actuation means was required and the entire system had to have an inordinately large bulk.

Another disadvantage of earlier techniques of associating fuse elements with a multiple switch resided in the possibility that replacement of the fuse element would cause damage to the individual carrying out the change or to some mechanism energized by the circuit unless the respective contacts were invariably open. In certain earlier devices, it was not always possible to ensure that the switch contacts were disengaged prior to removal of the fuse.

It is an object of the present invention to provide a compact electromagnetically operable switch device whose fuse elements are each associated with a respective set of contact members and cannot be confused with those of another set.

Still another object of this invention is to provide an inexpensive switch assembly wherein a multiplicity of jointly operable sets of contact members can be provided with respective fuse elements mounted upon a common support.

A further object of the instant invention is to provide a switch device of the character described wherein the aforementioned disadvantages are eliminated and to provide a novel fuse element for a device of this type.

These objects are attained, in accordance with my present invention, by providing a switch assembly wherein a support carries a movable contact member swingable between positions wherein it is remote from and in engagement with a contact member of a fuse element removably mounted upon the support, the movable contact member being so arranged that in its engaged position it secures the fuse element against ready removal. Preferably, the fuse element cooperates with at least one stationary member of the switch assembly with respect to which the fuse element is retained by the movable contact member.

According to one aspect of this invention, the fuse element is carried by the support for displacement relative to the latter in one direction, the movable contact member extending into the path of the fuse element in its engaged position to prevent withdrawal of this element in that direction but releasing the latter for removal in the disengaged condition of the movable member. In combination with this feature, or alternatively, the movable contact member can engage the contact portion of the fuse element in a direction transverse to its direction of movement so as to clamp the fuse element between the movable contact member and a stationary portion of the switch assembly in accordance with another aspect of my invention.

While this mechanism may be employed for a single set of switch contacts, it should be noted that it finds its principal utility in multiple-contact switches wherein a plurality of jointly operable contact members cooperate in sets to control respective electrical networks, a common actuating means, preferably electromagnetic, being provided to control all of the sets of contact. In this case it is desirable that numerous (i.e., at least two) overload-preventive devices, such as conventional cartridge-type fuses, be mounted upon a common carrier at a spacing essentialy equivalent to the spacing between the movable members of the array of contacts whereby the entire carrier can be withdrawn when all of the movable contacts are shifted into their disengaged position. For this purpose, the switch support, which can include a casing surrounding the movable and stationary contact members and enclose the fuse elements in their entirety, is provided with a track or the like along which the fuse carrier is slidably displaceable. In this connection it may be noted that the movable contact members can form a planar array swingable about a common axis lying in the plane thereof while the fuse carrier is displaceable perpendicularly to this axis, i.e., generally transversely to this plane.

According to still another feature of this invention, the actuating means cooperating with each movable contact member cooperates with a detent mechanism for securing the movable contact member against displacement from one of its operative positions into the other against the force of a resilient means, electromagnetic means being provided to release the detent. In one facet of this invention, the last-mentioned electromagnetic means can be the same coil serving to displace the movable member between its positions, while in accordance with another facet of this invention a separate electromagnetic device can be provided.

It is also contemplated, in accordance with the instant system to employ so-called "knife-type" fuses having blade-like contact portions on one or both of its extremities and a fuse wire or strip bridging the contact portions. In this case, the blade of the fuse element can lie in a plane parallel to the movable contact members which are also of blade-like configuration so that they engage the contact portion of the fuse element over a considerable surface area. The movable member may then be displaced generally transversely to the plane of the fuse blade so as to bring the set of contact members into engagement along the surface with flat abutment, or the movable member can be displaced in its plane so as slidably to engage the counter contact of the fuse element.

The above and other objects, features and advantages of the present invention will become more readily apparent from the following description, reference being made to the appended drawing in which:

FIG. 4 is a diagrammatical elevational view of a modified switch device according to my invention;

FIG. 5 is an axial cross-sectional view through a fuse of the type incorporated in the apparatus of FIG. 4;

FIG. 7 is a plan view of the device of FIG. 4;

FIG. 8 is a transverse cross-section through still another switch device; and

FIG. 9 is a plan view of the device of FIG. 8.

Figure 1:
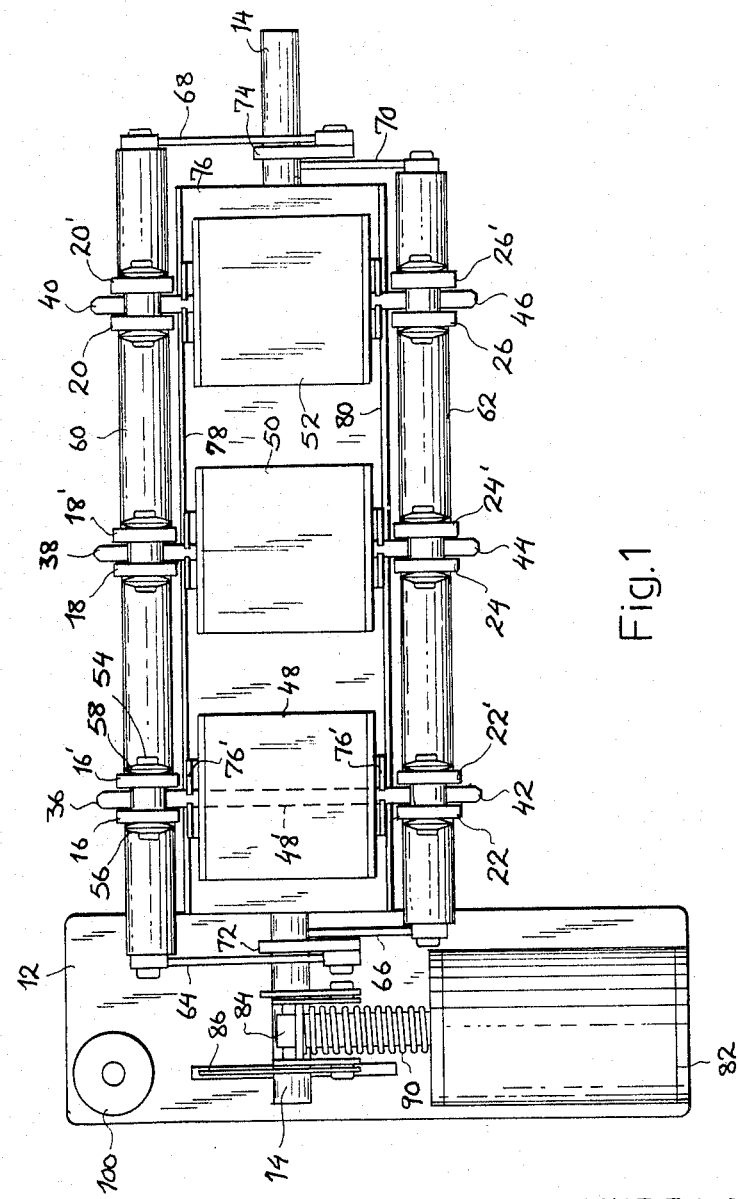
FIG. 1 is a front-elevational view of a remote-control switch assembly according to the invention.
Figure 2:
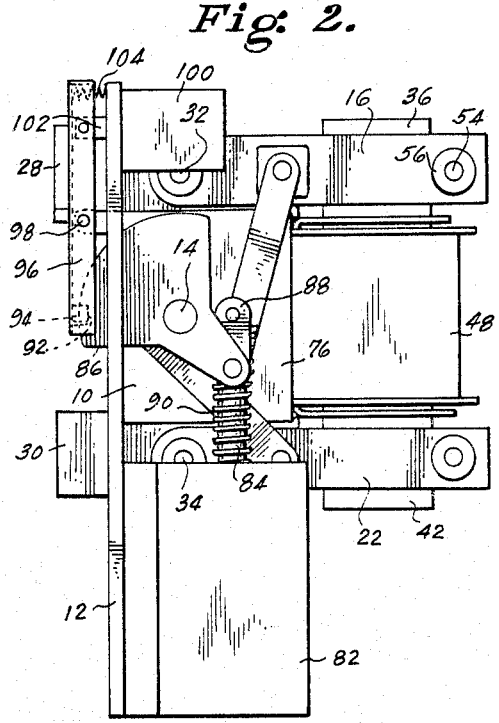
FIG. 2 is a side-elevational view of the assembly of FIG. 1 in its engaged position.
Figure 3:
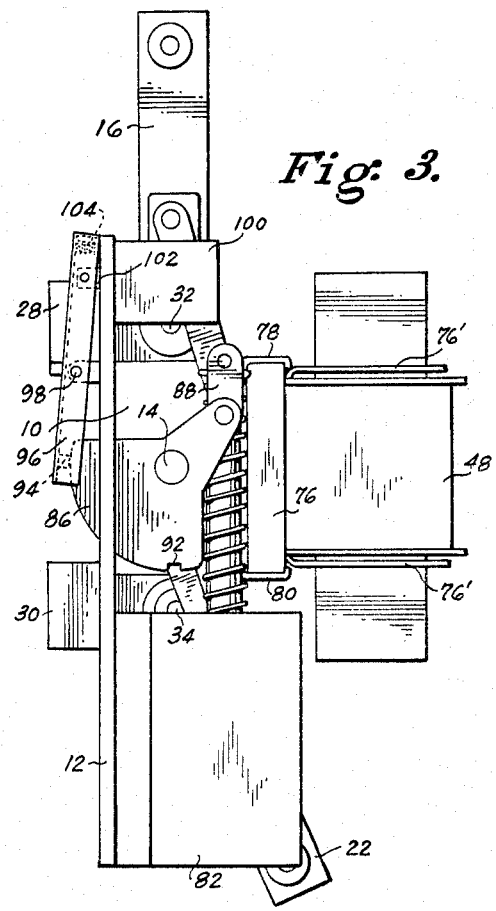
FIG. 3 is a view similar to FIG. 2, showing the mechanism in its disengaged position.

In FIGS. 1–3, I show a remotely controlled switch mechanism which can be incorporated within a housing in the conventional manner and includes a support comprising an insulated block 10 whose smaller side has affixed thereto an insulating plate 12 carrying the actuating mechanism of the device. A control shaft 14, constituting part of the actuating means, is journaled in block 10 and extends therethrough; this shaft being connected to respective movable contact members 16, 16'; 18, 18'; 20, 20', and 22, 22'; 24, 24'; 26, 26' in a manner to be described hereinafter. These movable contact members are axially spaced along shaft 14 and have the configuration of paired blades which have corresponding extremities pivoted by respective pins 32, 34 to angle rails 28, 30 as best seen in FIGS. 2 and 3, these rails being secured to insulating body 10. The opposite extremities of each of the blade-like contact members are designed to straddle respective contact members 36, 38, 40 and 42, 44, 46 forming two sets of terminals likewise of blade-like configuration. These stationary contact members constitute projecting portions of the contact regions of respective fuses 48, 50, 52 releasably held on a common carrier 76 by conventional spring clips 76'. The fuses are, in this case, of the usual blade-cartridge type and include a replaceable or irreplaceable fuse strip, diagrammatically represented by broken lines at 48' in FIG. 1, bridging the contact portions 36 and 42, for example. Generally, the fuse strip 48' is embedded in a nonconductive spark-quenching material to reduce deterioration of the use when the latter is designed for high current flow.

To prevent the fuses from being withdrawn when the contact members 16, 16' . . . 26, 26' are in their engaged position, the blades 16, 16' etc. of the respective pairs can be interconnected at their outermost extremities by respective bolts 54 and dished-spring washers 56, 58 which urge the blades toward one another and thus resiliently hold them against the respective stationary contact member 36, etc., in the engaged position of the switch. If it is desirable to reduce arcing upon making and breaking contact, the movable members can be provided with so-called "precontact" strips engageable with the stationary contacts somewhat before the main switch closure.

The respective sets of blade members, 16, 16'; 18, 18'; 20, 20' and 22, 22'; 24, 24'; 26, 26' are interconnected via insulating spacers 60 and 62 for joint operation, similar spacers serving to connect the blade members with the control shaft 14. For this purpose pairs of arms 64, 66 and 68, 70 connect the respective set of blade members with double-arm levers 72, 74, secured to control shaft 14 at opposite ends of the bank of fuses. The insulating carrier plate 76 is slidably displaceable within a pair of channels 78, 80 mounted upon block 10 and constituting guide means for the carrier 76. The latter can, therefore, be drawn out of the assembly to the left (FIG. 1), when the blades 16, 22, etc., are in their disengaged position (FIG. 3); when the blades are in their engaged position (FIG. 2) such joint removal of the fuses is not possible.

The actuating means for the contact members includes an electromagnet 82 mounted upon insulating plate 12 and having a vertically displaceable core 84 connected with a sector-shaped camming disk 86 via a link 88, sector 86 being mounted upon shaft 14 for rotating the latter. Magnetic core 84 is surrounded by a compression spring 90 which urges the disk sector 86 in a counterclockwise direction (as viewed in FIGS. 2 and 3) against the force of magnet 82. This sector is provided with a cutout 92 engageable with a tooth 94 when the disk is rotated clockwise. The tooth 94 is formed on a detent 96 constituting part of the latching mechanism for the assembly. The detent or pawl 96 pivots at 98 on plate 12 and is connected with the armature 102 of a further electromagnet 100 adapted to draw this pawl against the force of a compression spring 104 to release sector 86.

When the assembly is in its position shown in FIG. 3, a brief energization of electromagnet 82 will draw the core 84 downwardly against the force of spring 90, simultaneously compressing the latter and swinging sector 86 clockwise to bring recess 92 into a position wherein spring 104 can urge the tooth 94 of detent 96 into engagement therewith, thereby holding the sector 86 and shaft 14 in their positions shown in FIG. 2. Shaft 14 has, concurrently rotated levers 72, 74 to draw the blade members 16, 22, etc., into engagement with their respective countercontact 36, 42, etc. When it is desired to release the switch, electromagnet 100 is energized to draw the tooth 94 from recess 92 and release sector 86, whereupon the force of spring 90 displaces the sector and shaft 14 counterclockwise into the position illustrated in FIG. 2, thereby de-energizing the circuit and permitting removal of the fuse carrier 96 as previously described. Members 28 and 30, associated with each set of contacts 16, 16' . . . 26, 26', can serve as means for connecting the switch in an associated electrical circuit.

FIGS. 4–7 illustrate a modified remote-control switch capable of utilizing conventional fuse plugs for low-current applications. Fuse plugs of this type, some of which are provided with projecting contacts, are well-known and, for the most part, make use of windows or the like through which the condition of the fuse wire can be determined by visual observation. The device of FIGS. 4–7 basically comprises a plurality of electromagnets 122, only one of which is illustrated (FIG. 4), spacedly mounted within the usual switch casing diagrammatically represented at 124 in FIG. 4 and shown in view in FIG. 7. Each of a plurality of sets of contact members within this casing includes a respective movable contact member 126 swingably mounted in the casing for engagement with a contact member 154 associated with an overload-protective element 120' containing a fuse plug 120 to be described in greater detail hereinafter. A stationary connecting piece 128 forms part of the means for placing the respective switch in the external electric circuit and is joined with the respective movable member 126 as best seen in FIG. 4. FIG. 7 shows that a plurality of such connecting members 128, 128' and 128" are provided, one for each of the contact members. For displacement of the contact members 126, a plurality of respective slide bodies 130 are provided, these bodies receiving the contact blades 126 to entrain the latter upon displacement of the bodies 130 in vertical direction along suitable guide means not shown (the guide means can consist of pairs of rails along the left and right sides of body 130 as seen in FIG. 4). Slide 130 has a compression spring 132 seated against its upper extremity in such manner as to urge the slide downwardly against the force of the respective electromagnet 122 whose armature 146 has a magnetically permeable portion 146′ (FIGS. 6a–6d). At an intermediate portion along the slide 130 there is provided a recess 134 engageable by the hook-shaped end 138 of a detent 136 pivoted at 140 to the housing 124. A compression spring 142 bearing upon this detent 136 urges the hook-shaped portion into engagement with recess 134 when the latter is properly aligned therewith.

Figure 6A:
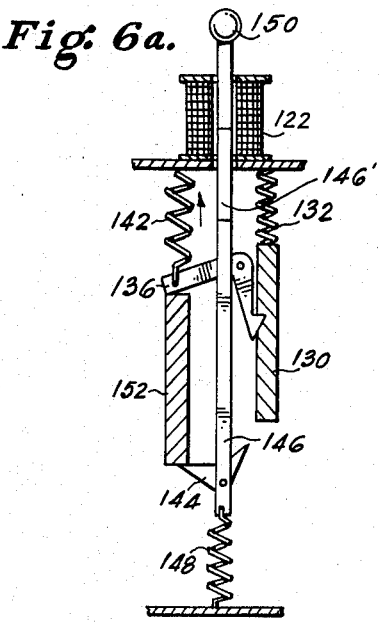
FIGS. 6a–6d are fragmentary views generally similar to FIG. 4, showing the device in successive operative positions.
Figure 6C:
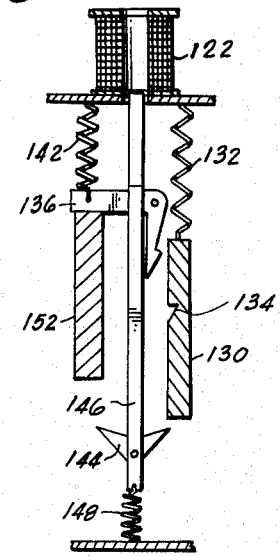
Figure 6B:
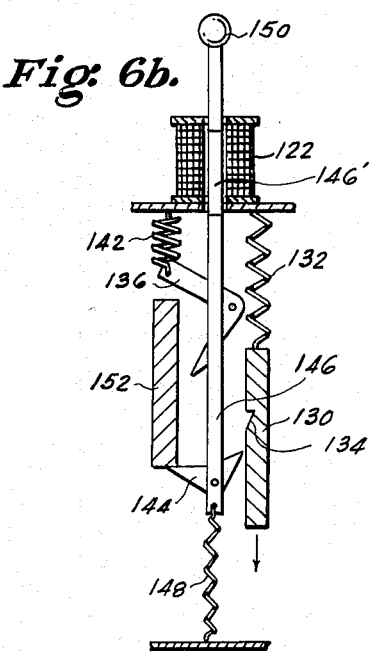
Figure 6D:
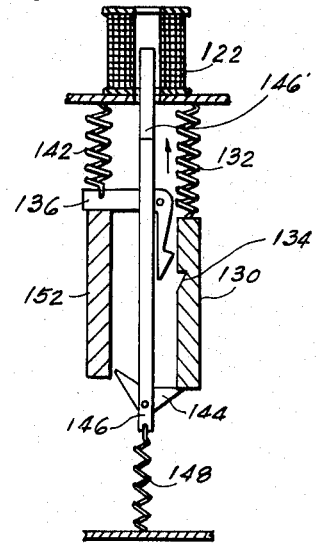

The armature 146 of magnet 122 is provided with a triangular pawl 144 which, as a consequence of its own weight, normally takes the position shown in FIG. 4 but is tiltable between two limiting positions as illustrated in FIGS. 6b and 6d; a tension spring 148 tends to displace the rod 146 against the force of the magnetic field. The overload-protective element 120′, whose contact portion is shaped as a blade 154 adapted to be engaged by blade 126 in surface contact, also cooperates with a fixed connecting member 168 serving as the other means for inserting the assembly into a circuit, two additional members 168′, 168″ being illustrated in FIG. 7 for connecting the other switch assemblies into respective circuits.

The operation of the actuating mechanism of FIGS. 4 and 6a–6d will now be described. Pawl 144 serves as a means for alternately coupling the armature 146 with switch-closing slide 130 and with switch-opening slide 152 during successive energizations of electromagnet 122 whereby the contact arm 126 is alternately brought into engagement with fuse terminal 154 and restored to its disengaged position shown in FIG. 4. With the system in the position illustrated in FIG. 6a, a momentary energization of electromagnet 122 causes pawl 144 to engage the lowermost body (i.e., the sliding body 152, whose guide means is not illustrated but is similar to that of body 130), to elevate this slide until it strikes detent 136 to remove it from engagement with body 130 (FIG. 6b) whereupon spring 132 displaces the latter downwardly. When the magnet 122 is de-energized, armature 146 drops and spring 142 again shifts the detent 136 into a position (FIG. 6c) in which it can engage body 130 while simultaneously restoring slide 152 to its original position when the slide 130 is raised upon a subsequent re-energization of magnet 122 (FIG. 6d). A ball-shaped handle 150 is provided on armature 146 for the manual operation of the switch. In FIG. 7 it may be seen that a single such handle is provided for all of the armatures 176. It may be noted at this point that a single magnet 122 can be provided with bodies 152 and 130 extending longitudinally along the housing with the latter engaging all the blades 126 and constituting, in effect, a slotted plate through whose apertures the blades 126 project. Preferably, each of the blade members 126 is bifurcated to engage the blade 154 on opposite sides thereof.

As shown in FIG. 5, the overload-protective element 120′ includes a casing 156 having an opening 158 at its closed extremity, this opening being alignable with a glass window 160 and a passage 164 in a contact member 162 whose terminal portion 166 projecting outwardly of the casing 156 engages the connecting piece 168 as illustrated in FIG. 4. The plug fuse 120 has one of its contact extremities seated against member 162 and is provided with a window in this extremity aligned with opening 158 through which the fuse wire can be viewed. At the opposite extremity of fuse 120, it is provided with a contact 120″ which passes through an annular spacer body 170, centering the fuse 120 with the casing 156, into engagement with the contact member 154, which is threadedly receive within a cover 172 screwed into casing 156. Body 170 can be a bushing composed of an insulating material such as a sintered ceramic. All the fuse elements 120a′, 120b′, 120c′ of the switch device are seen to be mounted upon a common carrier 174 slidably displaceable into the housing 124 so that the windows 158, 158′, 158″ of these fuse elements are alignable with openings 176, 176′, 176″ in the housing through which the condition of the fuse wire can be observed. When the blade members are in their disengaged position (FIG. 4), the carrier 174 can be withdrawn in a direction perpendicular to the plane of this figure, whereas the blades 126 in their engaged position block such displacement.

In FIGS. 8 and 9 there is illustrated another type of switch assembly wherein a plurality of blade-type cartridge fuses 48a, 50a, 52a are mounted upon a common insulating carrier 76a slidable in channels 78a, 80a in the direction parallel to the plane of the terminal portions 36a, 42a of these fuse elements (FIG. 8). The carrier 76a is provided with a handle 76a′ to facilitate removal of the fuses. Contact blades 36a, 42a are adapted to rest against respective stationary members 182, 180, respectively, forming guide rails for these blades and serving as anvils against which the blades can be clamped by movable members 16a and 183. Contact 16a is displaceable in a direction transverse to the direction of displacement of plate 76a and pivots about its bent edge 16a′ while being urged by a spring 16a″ away from contact 36a. A camming disk 181 is provided to clamp member 16a against contact 36a, this cam being coupled via a rod 16′ with the armature 184′ of an electromagnet 184a adapted to draw armature 184′ in the direction of arrow 187′. It should be noted that the electromagnetic actuating means of the present invention can include an electromotor adapted to displace the armature 184′ in the direction of arrow 187′ via a worm drive, for example. Armature 184′ is provided with an insulating portion 184 pivoted at 186 to the support and resiliently held against the force of the electromagnet 184a by a spring 188, a set of movable contacts 183 being secured to member 184 for joint displacement. Each of the blades 183, which are displaceable by element 184 in the direction of arrow 185 (i.e., transversely to the direction of displacement of slide 76a), is connected by a respective flexible conductor 189 of braided or woven copper or bronze wire to an associated connecting member 189′ which serves to join the respective switch, together with an opposite terminal member 182, in an external electrical circuit. When electromagnet 184 is energized, members 183 are swung counterclockwise to clamp blades 42a against anvils 180 while cams 181 lock members 16a against blades 36a and anvils 182, thereby preventing removal of slide 76a. It should be noted that the respective contact members 36a, 16a and 183, 42a can be provided with complementary formations to increase the security of the system against displacement when the blades are in their engaged positions. When eletcromagnet 184a is deactivated, spring 188 swings blade members 183 clockwise and similarly rotates cam 181 to release the fuse elements 48a, 50a, 52a so that the entire carrier 76a can be removed for replacement of the fuses. It should be noted that the positions of electromagnet 184a and spring 188 can be reversed if desired so that the switch is in its closed condition unless the electromagnet is energized.

The invention described and illustrated is believed to admit of many modifications within the ability of persons skilled in the art, all such modifications being considered within the spirit and scope of the appended claims.

What is claimed is:

1. A protective switching arrangement comprising a support; a carrier slidably mounted on said support for removal therefrom; fuse means on said carrier entrainable therewith and provided with first and second terminal means for the passage of current therethrough from an external circuit; first contact means on said support connectable to said external circuit and positioned for engagement with said first terminal means in an operative position of said carrier; second contact means on said support connectable to said external circuit and movably positioned for co-operation with said second terminal means in said operative position; actuating means operable for moving said second contact means into firm mechanical engagement with said second terminal means in said operative position, thereby preventing withdrawal of said carrier from said support; and restoring means for disengaging said second contact means from said second terminal means, thereby freeing said carrier for such withdrawal together with said fuse means.

2. A switching arrangement as defined in claim 1 wherein said actuating means comprises an electromagnet.

3. A switching arrangement as defined in claim 2 wherein said restoring means includes another electromagnet.

4. A switching arrangement as defined in claim 2 wherein said actuating means further includes a first movable element and said restoring means comprises a second movable element, said electromagnet being provided with an armature having means for alternately coupling same with said first and second elements during successive energizations.

5. A switching arrangement as defined in claim 1 wherein said second contact means and said second terminal means comprise two co-operating blade members, one of said blade members including a pair of blade straddling the other blade member upon engagement therewith.

6. A switching arrangement as defined in claim 1 wherein said second contact means comprises a stationary conductor member and a movable conductor member, the latter being coupled with said actuating means for clamping said second terminal means between said conductor members.

7. A switching arrangement as defined in claim 1 wherein said first and second contact means include respective conductor members both coupled with said actuating means for concurrent movement thereby into engagement with said first and second terminal means, respectively.

8. A switching arrangement as defined in claim 1 wherein said support comprises a housing with a wall having a viewing aperture therein, said fuse means comprising a shell with a fuse link therein and a window in said shell aligned with said aperture in said operative position for enabling observation of said fuse link.

9. A switching arrangement as defined in claim 1 wherein said fuse means comprises a plurality of fuses juxtaposed on said carrier in the sliding direction thereof, said second terminal means comprising a plurality of conductors each extending from a respective fuse in a direction substantially transverse to said sliding direction.

References Cited by the Examiner
UNITED STATES PATENTS

| | | | |
|---|---|---|---|
| 2,299,196 | 10/1942 | Wallace | 200—114 |
| 2,314,693 | 3/1943 | Dickinson | 200—114 |
| 3,018,349 | 1/1962 | Link | 200—132 X |
| 3,139,498 | 6/1964 | Linton | 200—121 |

BERNARD A. GILHEANY, *Primary Examiner.*

H. A. LEWITTER, *Assistant Examiner.*